United States Patent
Johnson

(10) Patent No.: US 10,193,936 B2
(45) Date of Patent: Jan. 29, 2019

(54) DATA COMMUNICATIONS

(71) Applicant: BRITISH TELECOMMUNICATIONS PUBLIC LIMITED COMPANY, London (GB)

(72) Inventor: Stephen Johnson, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/764,587

(22) PCT Filed: Sep. 29, 2016

(86) PCT No.: PCT/EP2016/073367
§ 371 (c)(1),
(2) Date: Mar. 29, 2018

(87) PCT Pub. No.: WO2017/055515
PCT Pub. Date: Apr. 6, 2017

(65) Prior Publication Data
US 2018/0295160 A1    Oct. 11, 2018

(30) Foreign Application Priority Data

Sep. 30, 2015  (EP) ..................... 15187796

(51) Int. Cl.
*H04L 29/06*  (2006.01)
(52) U.S. Cl.
CPC ........ *H04L 65/1069* (2013.01); *H04L 65/103* (2013.01)
(58) Field of Classification Search
CPC ................................... H04L 65/1069
See application file for complete search history.

(56) References Cited

U.S. PATENT DOCUMENTS

| 8,861,692 B1 | 10/2014 | Phelps et al. |
| 2002/0111159 A1 | 8/2002 | Faccin et al. |

(Continued)

FOREIGN PATENT DOCUMENTS

| EP | 1 643 740 | 4/2006 |
| EP | 2 597 849 | 5/2013 |

(Continued)

OTHER PUBLICATIONS

International Search Report for PCT/EP2016/073367 dated Dec. 16, 2016, 3 pages.

(Continued)

*Primary Examiner* — Jason D Recek
(74) *Attorney, Agent, or Firm* — Nixon & Vanderhye PC

(57) ABSTRACT

A first server comprises at least one processor configured to establish a connection between a terminal and a second server in a communications network. A connection is established between the terminal and the server by associating credentials with a user of the terminal; receiving from the second server over a non-WebRTC communications channel, a connection request comprising the CLI or the URI; identifying from the CLI or the URI comprised in the connection request, an address for the terminal; setting up the connection between the second server and the terminal; in which the connection comprises a WebRTC channel extending to the terminal and a non-WebRTC channel extending to the second server; in which the WebRTC channel and the non-WebRTC channel are interconnected for communication at an intermediate point of the connection; and disassociating the credentials from the user at a time at which it is determined that the user no longer requires the credentials.

16 Claims, 7 Drawing Sheets

(56) References Cited

U.S. PATENT DOCUMENTS

| | | | |
|---|---|---|---|
| 2006/0227959 | A1 | 10/2006 | Mitchell |
| 2014/0126714 | A1 | 5/2014 | Sayko |
| 2014/0126715 | A1 | 5/2014 | Lum et al. |
| 2014/0307858 | A1 | 10/2014 | Li et al. |
| 2014/0041366 | A1 | 11/2014 | Phelps et al. |
| 2015/0006610 | A1* | 1/2015 | Johnston ................ H04L 67/02 709/202 |

FOREIGN PATENT DOCUMENTS

| | | |
|---|---|---|
| GB | 2 517 760 | 3/2015 |
| JP | 2008-252829 | 10/2008 |
| JP | 2011-071741 | 4/2011 |

OTHER PUBLICATIONS

Written Opinion of ISA for PCT/EP2016/073367 dated Dec. 16, 2016, 7 pages.

* cited by examiner

DATA COMMUNICATIONS

This application is the U.S. national phase of International Application No. PCT/EP2016/073367 filed Sep. 29, 2016 which designated the U.S. and claims priority to EP Patent Application No. 15187796.6 filed Sep. 30, 2015, the entire contents of each of which are hereby incorporated by reference.

FIELD OF INVENTION

This invention relates to communications in general and to web based real time communications in particular.

INTRODUCTION

Web real time communications (WebRTC) is an emerging technology that enables secure peer to peer real time audio, video and data communications between a WebRTC-capable software applications such as web browsers, without the need for plugins. It has the potential to have a significant impact on the way we communicate in the future particularly in the customer to business space. Customers will be able to directly engage with businesses, including voice calls, through their web pages alone.

Typically, when a customer wants to contact a business via the phone, they will first of all visit the business's website to find the customer contact centre details. Contact centres are frequently busy and when the customer places the call, it is likely that they will be placed on hold in a queuing system until an agent becomes available. In many contact centres, if the expected queuing time exceeds a particular length, the customer will be offered the option of a call-back, where they can hang up and get called back once an agent becomes available. They may be asked to enter a number to be called back on, or potentially, the calling line identity (CLI) of the customer's phone may be used. Some business websites offer an alternative where the customer can simply type their contact number into the website and request a call when an agent becomes available, instead of having to call the customer contact centre first. In both cases, the customer contact centre has a phone number (identity) through which to call the customer back on.

Many businesses are now looking to employ WebRTC as a means to allow a customer to directly contact them through the website without the need for a phone. As shown in FIG. 1, a business sets up a website (somebusiness.com) on a web server 120 to provide information on-demand to customers of the business. For example, the business website may support a customer support web application jointly running in customer and customer support agent browsers. Customers are able to access information provided on pages of the website from a browser running on a suitable networked terminal 112, such as a computer system 60 (shown in FIG. 6) with internet access. The business also sets up a customer contact centre 124 comprising one or more customer support agent workstations 130 (each workstation, for example, comprising a conventional telephone 126 and a networked terminal 128). The customer contact centre 124 provides vocal assistance and advice to customers, especially customers who are facing problems and who have not been able to find a solution on the business website.

In FIG. 1, a voice channel (114, 116) is established between a customer terminal 112 and a customer support agent conventional telephone 126 or softphone running on networked terminal 128 via a WebRTC gateway 110, such as computer system 60 (shown in FIG. 6). The customer terminal 112 runs a WebRTC capable web browser. The voice channel is established over a WebRTC link between the WebRTC capable web browser and the WebRTC gateway 110. The voice channel is established over a PSTN or Session Initiation Protocol (SIP)/VoIP link 116 between the WebRTC gateway 110 and the customer support agent telephone 126 or softphone 128. That is, voice communications from the WebRTC-enabled web browser are converted to legacy voice technologies (e.g. PSTN or VoIP) by the WebRTC gateway 110 and then routed to the customer contact centre over a conventional voice channel. Similarly, voice communications from the customer support agent terminal are converted to WebRTC technologies by the WebRTC gateway 110 and then routed to the customer WebRTC-enabled web browser. Voice connection may be established between other customer support agents and other customers over end-to-end conventional links 118.

In many cases, the WebRTC customer will be anonymous at the contact centre, that is, the contact centre will not have access to any recognisable identity or CLI through which the customer can be contacted, thus ruling out call-back as an option for these customers.

STATEMENT OF INVENTION

This invention provides a mechanism for supporting call-backs initiated from a source operating over a non-WebRTC channel to a destination operating over a WebRTC channel. The source and destination are connected via a WebRTC gateway function. For example, certain embodiments of the invention facilitate call-backs to a WebRTC terminal from a customer contact centre without requiring modification of the customer contact centre or the WebRTC gateway structure. According to certain embodiments of the invention, this is achieved by introducing a Transient Call Manager (TCM) function that allocates and later releases a temporarily-contactable identity that does not comprise the user's identity but that can be used to route a call-back to a customer's terminal.

A method is provided of establishing a connection between a WebRTC-capable software application and a server in a communications network; in which the method comprises: associating credentials with the WebRTC-capable software application; receiving from the server over a non-WebRTC communications channel, a connection request comprising the credentials; identifying from the credentials comprised in the connection request, a signalling channel for WebRTC for signalling to the WebRTC-capable software application; using the signalling channel for WebRTC, setting up a WebRTC media channel extending to the WebRTC-capable software application as part of the connection between the server and the WebRTC-capable software application; in which the connection comprises the WebRTC media channel extending to the WebRTC-capable software application and a non-WebRTC channel extending to the server; in which the WebRTC media channel and the non-WebRTC channel are interconnected for communication at an intermediate point of the connection; and disassociating the credentials from the WebRTC-capable software application at a time at which it is determined that the WebRTC-capable software application no longer requires the credentials.

According to an embodiment, the credentials identify the WebRTC gateway as the destination of the non-WebRTC communications channel and the WebRTC gateway interprets the credentials as identifying the signalling channel for WebRTC for signalling to the WebRTC-capable software application.

According to a further embodiment, the time at which it is determined that the WebRTC-capable software application no longer requires the credentials is on termination of the connection between the server and the WebRTC-capable software application.

According to a further embodiment, the connection is established to carry a video or voice call; in which the time at which it is determined that the WebRTC-capable software application no longer requires the credentials is on termination of the call.

According to a further embodiment, the call is initiated in response to an anonymous call-back request issued by the WebRTC-capable software application.

According to a further embodiment, the anonymous call-back request comprises the credentials.

According to a further embodiment, the WebRTC media channel and the non-WebRTC channel comprise voice or video channels.

According to a further embodiment, the method further comprises receiving from the WebRTC-capable software application an authentication request comprising the credentials; and authenticating the WebRTC-capable software application based on the credentials received from the WebRTC-capable software application.

According to a further embodiment, the method further comprises providing the credentials to the WebRTC-capable software application;

According to a further embodiment, the non-WebRTC channel comprises at least one of a SIP, VoIP and PSTN voice channel.

According to a further embodiment, the WebRTC media channel and the non-WebRTC channel are interconnected for communication at a WebRTC gateway.

A first server is provided comprising at least one processor configured in use to establish a connection between a WebRTC-capable software application and a second server in a communications network; in which the at least one processor is configured in use to: associate credentials with the WebRTC-capable software application; receive from the second server over a non-WebRTC communications channel, a connection request comprising the credentials; identify from the credentials comprised in the connection request, a signalling channel for WebRTC for signalling to the WebRTC-capable software application; use the signalling channel for WebRTC, to set up a WebRTC media channel extending to the WebRTC-capable software application as part of the connection between the second server and the WebRTC-capable software application; in which the connection comprises the WebRTC media channel extending to the WebRTC-capable software application and a non-WebRTC channel extending to the second server; in which the WebRTC media channel and the non-WebRTC channel are interconnected for communication at an intermediate point of the connection; and disassociate the credentials from the WebRTC-capable software application at a time at which it is determined that the WebRTC-capable software application no longer requires the credentials.

According to an embodiment, the credentials identify the WebRTC gateway as the destination of the non-WebRTC communications channel and the WebRTC gateway interprets the credentials as identifying the signalling channel for WebRTC for signalling to the WebRTC-capable software application.

According to a further embodiment, the WebRTC media channel and the non-WebRTC channel comprise voice or video channels.

According to a further embodiment, the non-WebRTC channel comprises at least one of a SIP, VoIP and PSTN channel.

According to a further embodiment, the WebRTC media channel and the non-WebRTC channel are interconnected for communication at a WebRTC gateway.

DESCRIPTION OF EMBODIMENTS

According to certain embodiments, the invention provides a mechanism suitable for facilitating a call-back, managed by a customer contact centre queueing system, to a customer WebRTC-capable software application running on a customer's terminal where the customer's network location is not known to the contact centre. The customer contact centre agent's terminal does not support WebRTC and communicates with a WebRTC gateway via a non-WebRTC channel. According to the invention, a call-back received from a customer contact centre is directed, by a WebRTC gateway function via a WebRTC channel, to the customer WebRTC-capable software application, e.g. to a web page residing in a web browser running on the customer's terminal or to another form of WebRTC-capable software application, either direct or via a suitable API. For simplicity we use the term "browser" in the following to indicate all forms of WebRTC-capable software application. According to certain embodiments, the invention provides a Transient Call Manager function that cooperates with the WebRTC gateway and shares with the WebRTC gateway a temporary identity that the customer contact centre can reference and that facilitates routing of the call-back to the customer via the WebRTC gateway. While the temporary identity is recognised by the WebRTC gateway, it does not allow the customer contact centre to call the customer direct. A benefit of this invention is that it requires no changes to the customer contact centre infrastructure or to the WebRTC gateway (reducing costs) and allows the capability to be provided by a third party (promoting ease of implementation). Typically, the call-back is attempted at a time when an agent is expected to become available.

Figure 1:
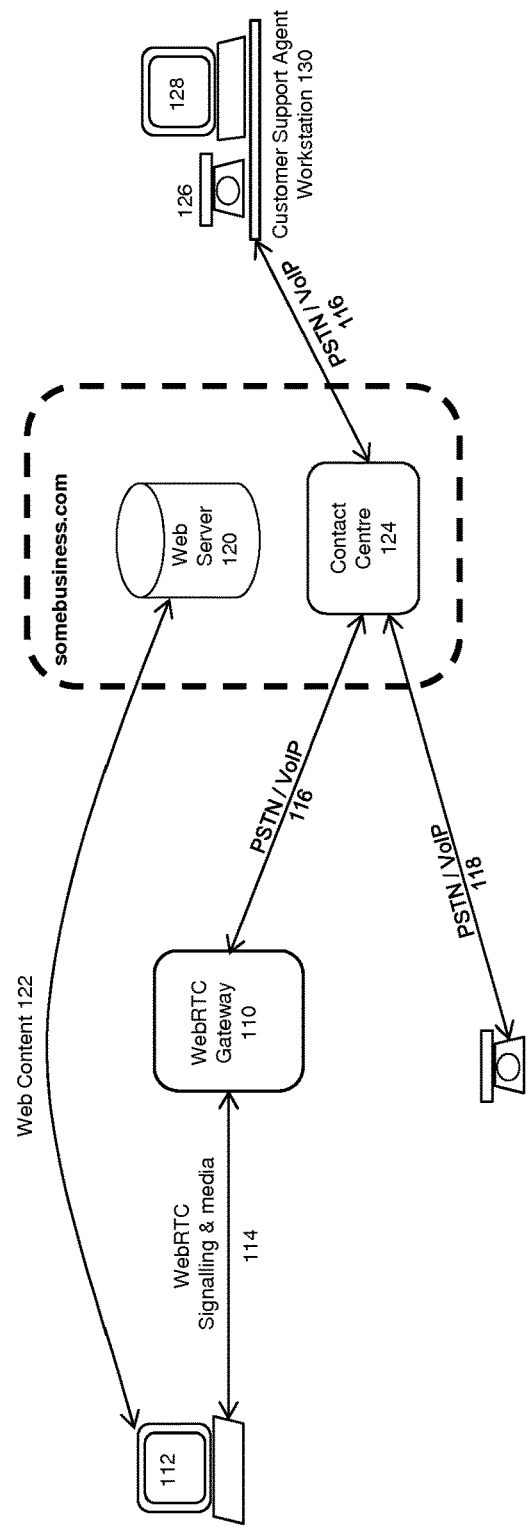
FIG. 1 shows schematic representation of aspects of a communications system.
Figure 2:
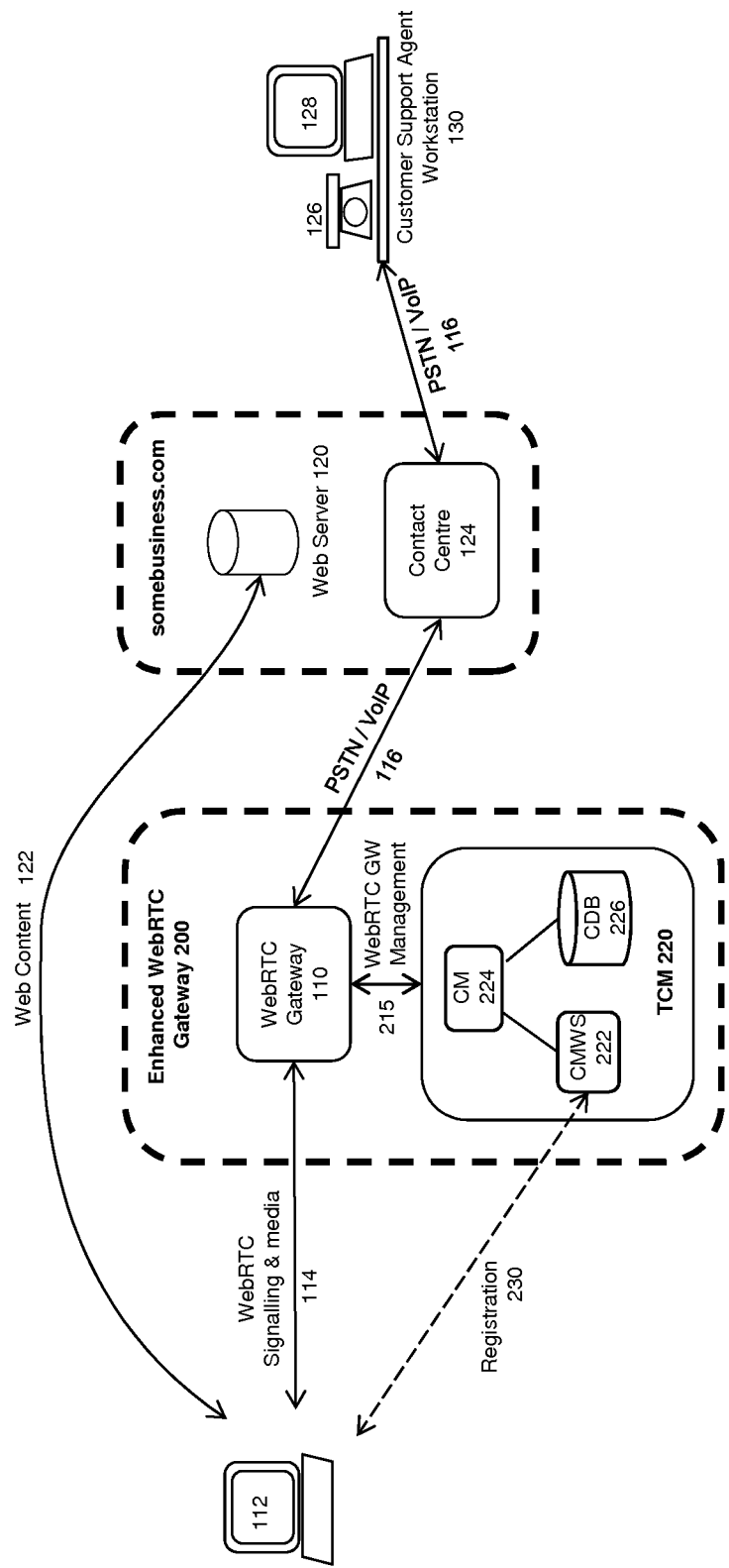
FIGS. 2 and 3 show schematic representations of aspects of a communications system according to embodiments of the present invention.

We now describe the invention in more detail, by way of example, with reference to the embodiment of FIG. 2. A website (somebusiness.com on web server 120) and a customer contact centre 124-130 are set up by a business to provide information and support to its customers (not shown). The customer contact centre is staffed by customer support agents (not shown) who can interact with customers via voice calls. Customers are also able to access information provided on the website pages from a browser running on a terminal 112. Customers are able to set up, from a browser, a voice call with a customer support agent via the customer contact centre. Customer terminal 112 is equipped with a WebRTC capable web browser that enables the customer to make voice calls using WebRTC.

Figure 3:
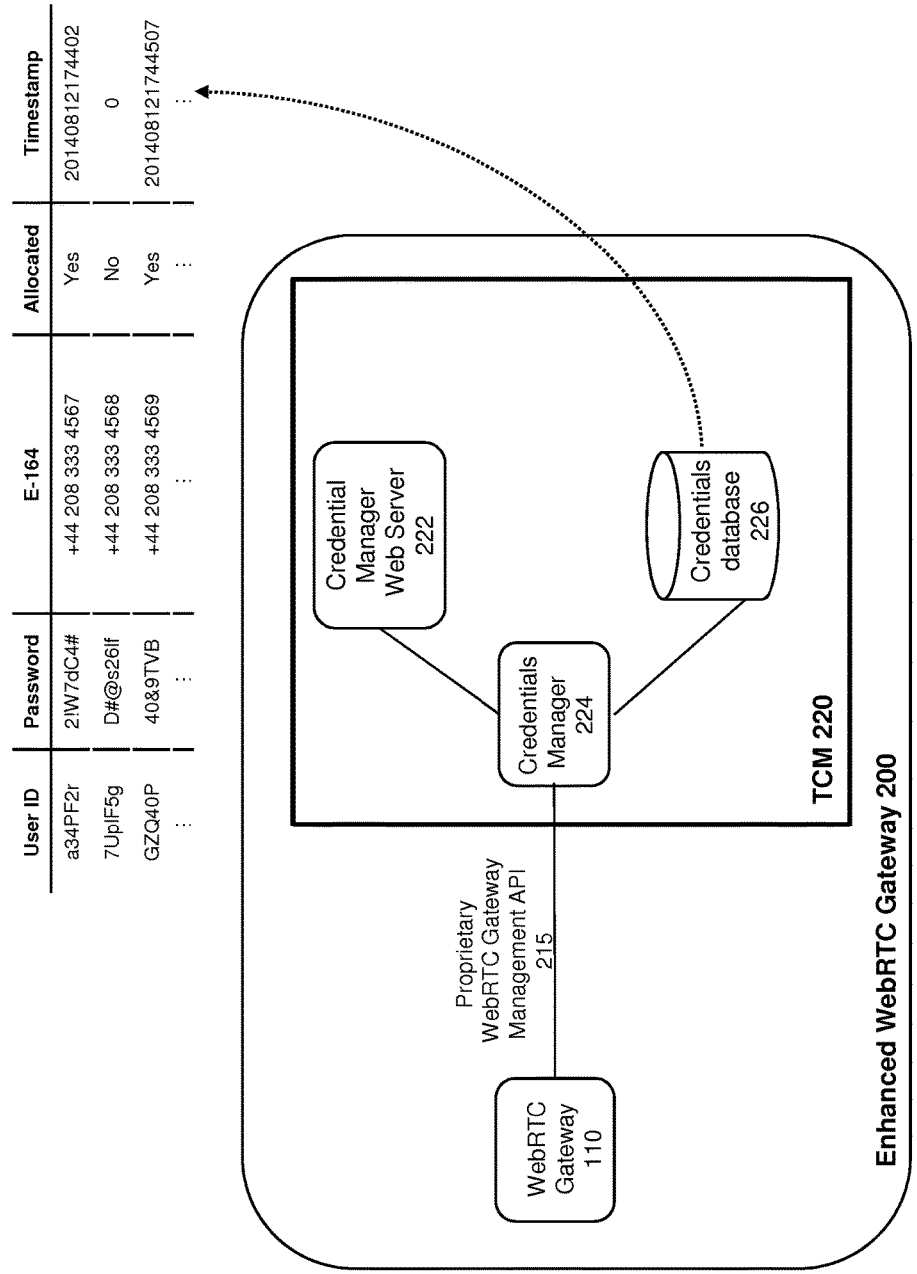

As shown in FIG. 3, the Transient Call Manager (TCM) 220 comprises three main components, a Credential Manager Web Server (CM web server or CMWS) 222, a Credential Manager (CM) 224 and a Credentials Database (CDB) 226 as described in detail next. TCM 220 and each main component thereof may be realised as a computer system 60 (shown in FIG. 6).

The CM web server 222 provides an interface (e.g. via Javascript or REST) towards a customer's web browser. The interface provides to the browser a temporary set of credentials (e.g. user ID and password) associated with the customer that allows the web browser to authenticate with a WebRTC gateway and initiate and receive WebRTC calls. According to an embodiment, the CM web server 222 expects to receive a periodic heartbeat from a web browser when it is waiting for a call-back. Failure to receive a heartbeat for a browsing session will indicate that the user has left the page and no longer requires a call-back. Detection of a failure to receive a heartbeat will prompt the CM web server 222 to instruct the credential manager 224 to release the temporary set of credentials, i.e. the credentials will no longer be associated (will be dissociated) with a user. The CM web server 222 also provides a means to identify when the temporary set of credentials can be released through an explicit release call which may be issued (for example by an on Unload Event Handler) when the user navigates away from the page.

Credential manager 224 manages user accounts provisioned on a WebRTC gateway 110 through the WebRTC gateway's proprietary management API 215. When requested by the CM web server 222, the Credential manager 224 will provide an unallocated user ID and password credential set and register it as allocated in the Credentials Database 226. The credential set is provisioned on the WebRTC Gateway and sent to the customer's web browser at this point. When the credential manager 224 is instructed to release a set of credentials, the Credentials Database 226 is updated appropriately. Each time the Credential manager 224 is requested to provide credentials, it will either generate or select from a store a unique set of credentials (user ID and password) that are not currently provisioned on the WebRTC gateway 110 and are not associated with a customer. Where the customer contact centre is able to initiate a call-back using a VoIP SIP URI, the SIP URI may be based on the user ID (for example sip:GZQ40P@wgw.somebusiness.com, where the user's ID is GZQ40P) and should be unique, otherwise the call may be routed back to an incorrect customer's web browser. The Credential manager 224 may check the Credentials Database 226 to ensure that the user ID is unique.

Where communications between the WebRTC gateway 110 and the customer contact centre 124-130 run over a circuit switched network (e.g. PSTN), instead of an IP network (e.g. SIP/VoIP), the credential manager 224 may also assign to the set of credentials an unallocated E.164 PSTN or mobile number from a pool of E.164 numbers that it has available. When the set of credentials includes an E.164 number, an inbound call to the E.164 number will be received by the WebRTC gateway 110 and routed appropriately by the WebRTC gateway 110 to the customer's browser. Again, the credential manager 224 may check the Credentials Database 226 to ensure that the assigned E.164 number is unique and not currently allocated.

When the allocated credentials are no longer required, the Credential manager 224 will release them, removing them from the WebRTC gateway 110 and from the Credentials Database 226. The association between the credentials and the customer is ended. The release of credentials can be initiated in several ways, for example:

1. By an explicit call from the CM web server 222 either when a release message is issued from the customer's browser due to the termination of the call-back call or the user navigates away from the page, or the CM web server 222 detects a loss of heartbeat with the browser
2. By a timer that runs periodically in the credential manager 224 and checks to see if any credentials in the database are older than a maximum time that the customer contact centre 124-130 will hold call-backs for.

FIG. 3 shows typical contents of Credentials Database 226. Credentials Database 226 stores the credentials provisioned on to the WebRTC gateway 110 and records whether they have been allocated to a customer. As shown in FIG. 3, typical data fields may include user ID and associated password. Where appropriate, the database may also store an E-164 phone number against each user ID. Calling the E.164 number will route the call to the WebRTC gateway 110. Where the customer contact centre 124-130 does not support outbound VoIP calls, the E.164 numbers may be used to access the WebRTC gateway 110. According to a further embodiment, the allocation time may also be recorded in a data field and used for housekeeping activities such as releasing credentials after a period of time.

There are a number scenarios in which a call-back may be triggered. In one scenario, the customer calls the customer contact centre 124-130 via WebRTC using the transient credentials provided by the Credential manager 224. The call may be propagated by the WebRTC gateway to the contact centre over a PSTN or SIP/VoIP connection and a call-back may be requested to the CLI or URI associated with the PSTN or SIP/VoIP connection that is presented to the contact centre. Another scenario involves placing a call-back request in the customer contact centre queue using a customer contact centre API initiated from the customer's web browser. In both cases, when the customer's place in the queue reaches the front, they will be called back using the normal procedure for call-backs within the contact centre. Typically this will be to call the customer back, and when they answer, place them in the queue awaiting the next available agent that has the appropriate skills to handle the call.

Figure 4A:
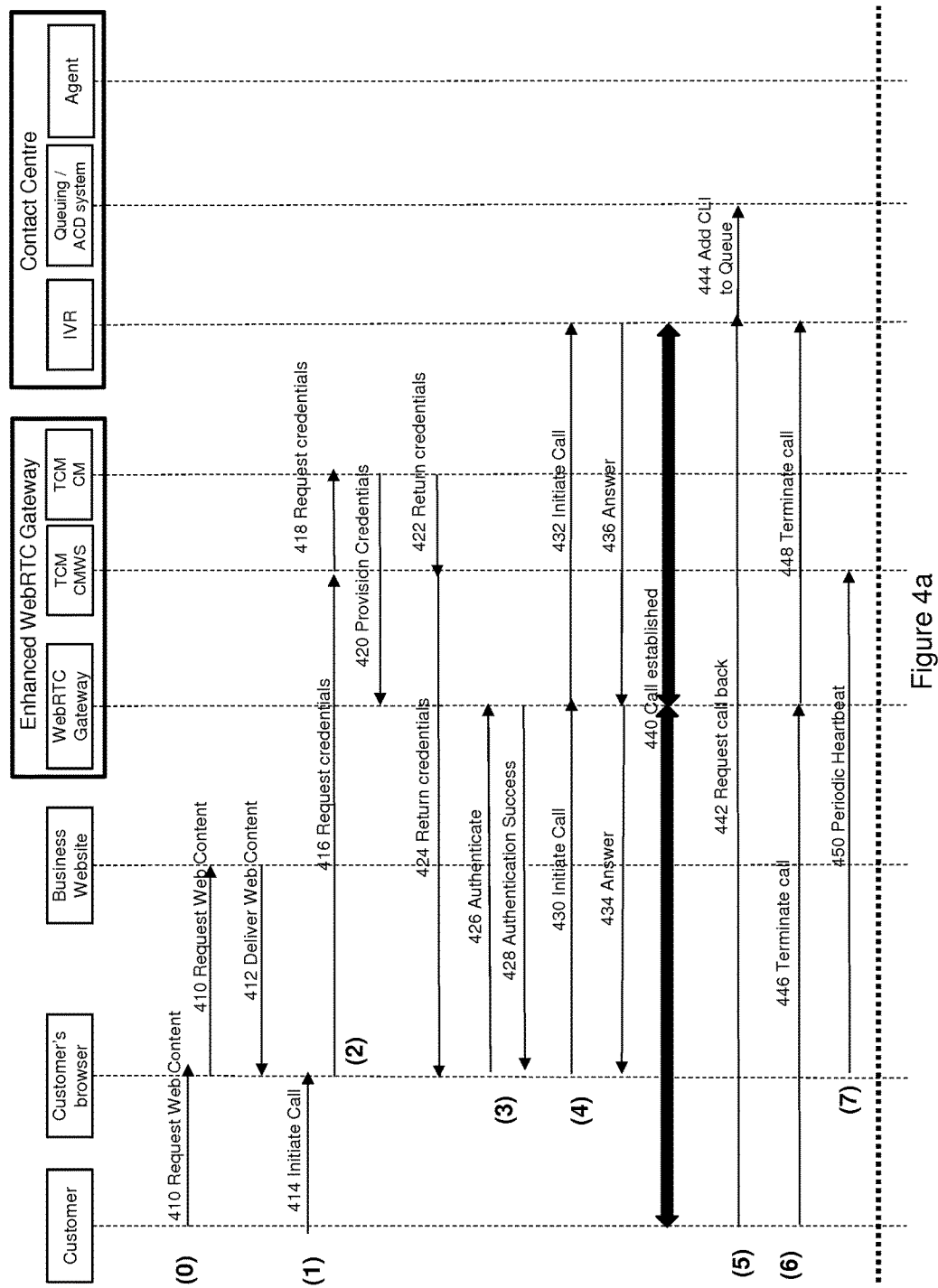
FIGS. 4a, 4b and 5 show sequences of actions according to embodiments of the present invention.
Figure 4B:
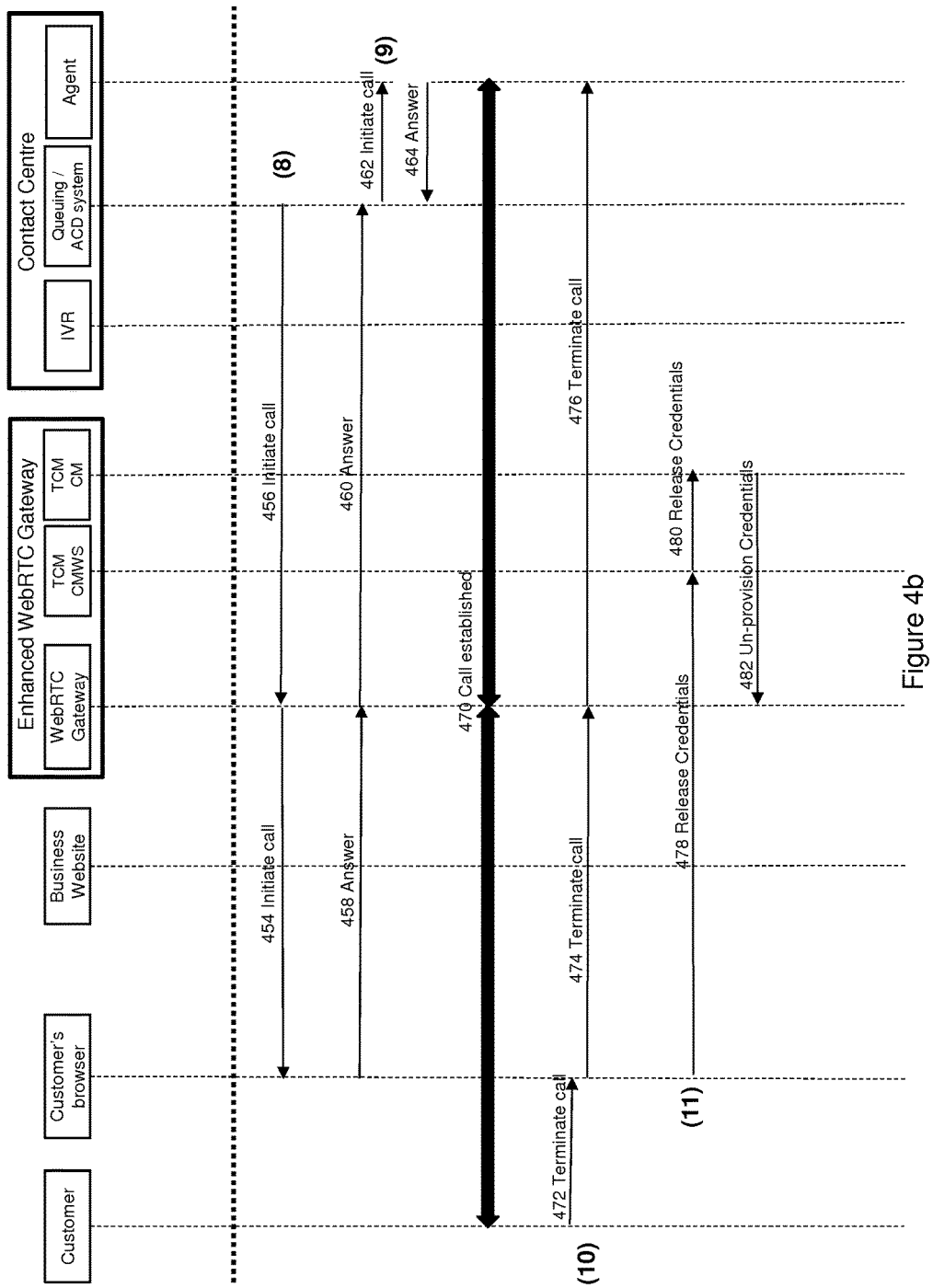

FIGS. 4*a* and 4*b* show a first scenario: Call-back setup via initial call to customer contact centre. This first scenario proceeds as follows.

0. Customer navigates to business web site in a web browser (see 410 "request web content" from customer browser to business website and 412 business web site delivers requested content).
1. Customer initiates a call to the business's customer contact centre 124-130 over WebRTC by clicking on a 'contact us' link on a web page displayed in customer's browser (see 414 "initiate call").
2. The web page requests a set of credentials from the Credential manager 224 (see 416 "Request credentials" sent from customer's browser to CM web server 222 and 418 "Request credentials" sent from CM web server 222 to credential manager 224). Credential manager 224 either generates (not shown) or selects from a store (not shown) a unique set of credentials and then provisions them 420 on to WebRTC gateway 110 using the gateway's proprietary management interface. Credential manager 224 also returns the set of credentials to the customer's browser.

3. The web page in the customer's browser uses these credentials to authenticate 426 with WebRTC gateway 110 and to establish a signalling channel to the gateway (not shown—this is a standard WebRTC operation). Where appropriate, WebRTC gateway 110 notifies 428 the customer's browser of successful authentication.

4. On successful authentication, the web page in the customer's browser places a call from the browser to the contact centre, via the WebRTC gateway 110 (see 430, 432 "Initiate Call"). We follow the case where the customer contact centre 124-130 is busy, so that a call-back is offered. In the busy case, the customer's call will be answered (436, 434) by the contact centre's Interactive Voice Response (IVR) system via WebRTC gateway 110. A call between the customer and the contact centre IVR system is established (440).

5. In the course of the call, the contact centre IVR system gives the customer the option to receive a call-back instead of waiting (not shown), which the customer accepts (442). The contact centre IVR system then inserts (444) the CLI or SIP URI presented on call initiation by the WebRTC gateway 110 into the contact centre queuing system.

6. The user or the IVR system then terminates the call in the usual way (FIG. 4a shows termination being instigated (446, 448) by the customer via WebRTC gateway 110).

7. Once the initial call has been terminated, the web page in the customer's browser issues periodic heartbeat messages 450 to the CM web server 222 to indicate that the page in the browser is still active. If a heartbeat is not received by the web server when expected, it will inform the credential manager 224 to release the session. Session release will involve invalidating or removing the credentials held on the WebRTC gateway 110 and invalidating or removing the credentials held on the Credential Database. A call-back from the customer contact centre 124-130 after this point will receive a number not available response.

8. Moving on to FIG. 4b, after some indeterminate delay, the customer's placeholder nears the front of the contact centre queuing system. The customer contact centre 124-130 initiates (456) a request for a call-back call using the CLI or URI presented (432) on call initiation by the WebRTC gateway 110. The call request 456 is routed to the WebRTC gateway 110, which then passes 454 signalling (INVITE) to the user's browser via the WebRTC signalling channel established earlier. The customer accepts the call and customer's browser sends an "answer" message to WebRTC gateway 110, which forwards 460 it to the contact centre queuing system. A call is now established between the customer and the customer contact centre 124-130, however, the call may still be in the queue and the customer on hold until an agent comes available.

9. The automatic call distribution system (ACD) in the customer contact centre identifies a subset of agents that are able to handle the call. When one of these agents becomes available, the ACD transfers (462) the customer call that is on hold to the agent—the call to the customer will be established once the agent answers (464) the call. The call-back call 470 is now established between the customer and the customer contact centre agent.

10. At some point the call is terminated by either the customer or the agent (FIG. 4b shows the case where the call is terminated by the customer instructing 472 the customer's browser to send a "terminate call" message 474 to the customer contact centre). The "terminate call" message 474 is forwarded 476 to the customer contact centre by WebRTC gateway 110.

11. The web page in the customer's browser detects the call termination and sends 478 a "release credentials" message to the CM web server 222. In turn, the CM web server instructs the credential manager 224 to release the credentials. The credential manager 224 will then invalidate the credentials on or remove the credentials from the WebRTC gateway 110 and invalidate the credentials on or remove them from the Credentials Database 226. The credentials will be dissociated from the customer.

Figure 5:
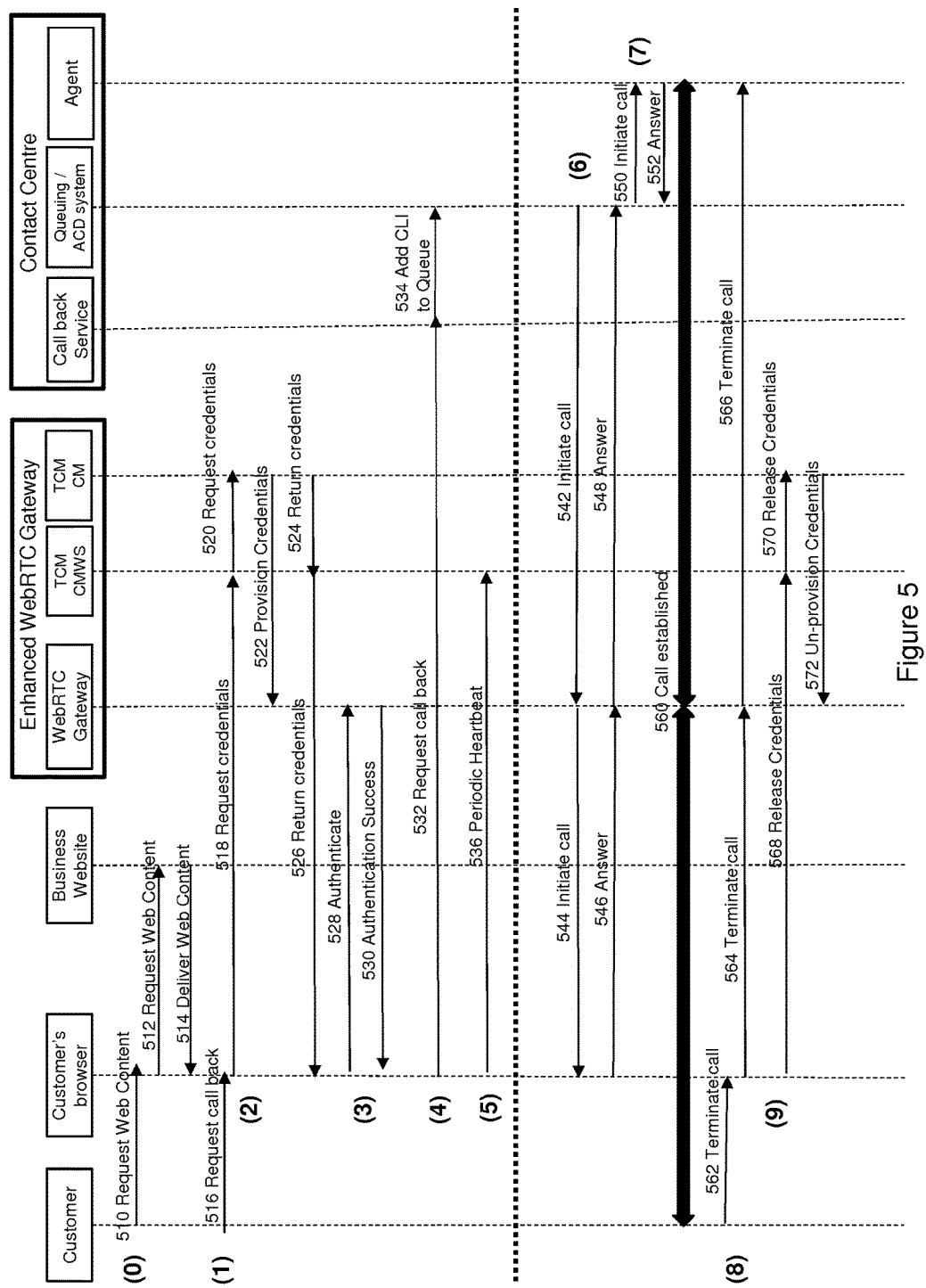

FIG. 5 shows a second scenario: Call-back setup via the website. This second scenario proceeds as follows.

0. Customer navigates to business web site in a web browser (see "Request web content" 510, 512 from customer to business web site and "Deliver Web Content" 514 from business web site to customer's browser).

1. Customer registers for a call-back by clicking 516 a link on the webpage in the customer's browser to set up a call-back.

2. In response to the customer clicking the link, the web page requests 518, 520 a set of credentials from the Credential manager 224 via the CM web server 222. The Credential manager 224 will either generate (not shown) a unique set of credentials or select (not shown) a unique set of credentials from a store and then provision the set 522 on to the WebRTC gateway 110 using the gateway's proprietary management interface. The credential manager 224 will also return 524, 526 the set of credentials to the customer's browser via CM web server 222. The Credential manager 224 will also return to the customer's browser the call-back SIP URI or the call-back E.164 CLI that the customer contact centre 124-130 should use to make a call to the browser via the WebRTC gateway 110.

3. The web page in the customer's browser uses the credentials received from credential manager 224 to authenticate with the WebRTC gateway 110 and establish a signalling channel (not shown—this is a standard WebRTC operation).

4. The web page sends to the Contact Centre's call-back service a message 532 containing call-back SIP URI or the call-back E.164 CLI and requesting a call-back. The call-back service inserts 534 the CLI/URI into the contact centre's queuing system. The contact centre's call-back service may also support the removal of a call-back from the queuing system, which may be called by the web browser, for example, where the user navigates away from the web page.

5. The web page in the web browser may issue periodic heartbeat messages 536 to the web server to indicate that the page in the browser is still active. If a heartbeat is not received by the web server when expected, it will inform the credential manager 224 to release the session. Releasing the session involves removing or invalidating the credentials with the WebRTC gateway 110 and removing or invalidating the credentials with the Credential Database. A call-back attempt from the customer contact centre 124-130 after this point quoting the credentials will receive a "number not available" response.

6. After some indeterminate delay, the customer's placeholder nears the front of the contact centre queuing system. The customer contact centre 124-130 initiates (542) a call request using the URI or CLI provided with the customer's request for call back 532. The call request is routed to the WebRTC gateway 110, which then passes 544 signalling (INVITE) to the user's browser via the WebRTC signalling channel established earlier. The customer accepts the call and customer's browser sends 546 an "answer" message to WebRTC gateway 110, which forwards 548 it to the contact centre queuing system. A call is now established between the customer and the customer contact centre 124-130, however, the call may still be in the queue and the customer on hold until an agent comes available.

7. The automatic call distribution system (ACD) in the customer contact centre identifies a subset of agents that are able to handle the call. When one of these agents becomes available, the ACD transfers (550) the customer call that is on hold to the agent—the call to the customer will be established once the agent answers (552) the call. The call-back call 560 is now established between the customer and the customer contact centre agent.

8. At some point the call is terminated by either the customer or the agent (FIG. 5 shows the case where the call is terminated by the customer instructing 562 the customer's browser to send a "terminate call" message 564 to the customer contact centre). The "terminate call" message 564 is forwarded 566 to the customer contact centre by WebRTC gateway 110.

9. The web page in the customer's browser detects the termination and sends a 568 "release credentials message" to the CM web server 222. In turn, the CM web server instructs 570 the credential manager 224 to release the credentials. Credential manager 224 will then invalidate the credentials on or remove the credentials from the WebRTC gateway 110 and invalidate the credentials on or remove the credentials from the Credentials Database 226. The credentials will be dissociated from the customer.

In an alternative embodiment of the invention, a customer's browser may still receive a call from the customer contact centre 124-130 despite the fact that the customer has navigated away from the web page supporting the call-back or despite the fact that the browser has been closed. For example, mobile-style push notifications will allow a server to wake up a browser and open (or re-open) a web page. This is supported by version 42 of Chrome via the Google Cloud Messaging service. On receiving (456, 542) the call-back request from the customer contact centre 124-130 WebRTC gateway 110 may use such push notifications to wake up the customer's browser so that it may receive the call-back. In such an embodiment, there is no need for a heartbeat message to be issued or monitored. As before, if an attempt to initiate a call fails, a "number not available" response is provided to the customer contact centre 124-130.

Figure 6:
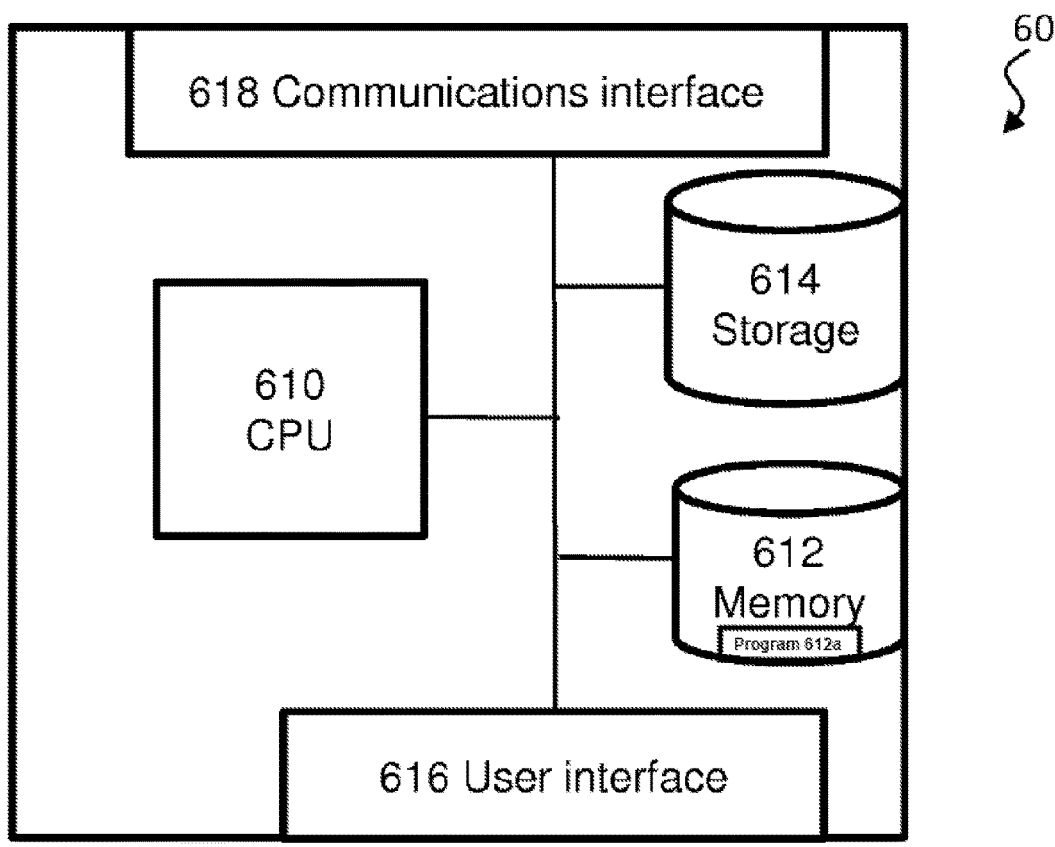
FIG. 6 shows a block diagram of a computing device according to an embodiment of the present invention.

FIG. 6 shows a computer system 60 in accordance with the disclosed embodiments. Computer system 60 may correspond to an apparatus that includes a processor 610, memory 612, storage 614, user interface 616 and communications interface 618 and/or other components found in electronic computing devices. Computer system 60 may also include input/output devices (not shown) such as a keyboard, a pointing device and a display communicating with processor 610 via user interface module 616. Computer system 60 may also, via communications interface module 618 (which may comprise a plurality of network interfaces), be connected to or have the capability for connection to one or more communications network, such as a wired, wireless or hybrid LAN, WAN or internet.

Insofar as embodiments of the invention described are implementable, at least in part, using a computing device such as shown in FIG. 6 (i.e. a software-controlled programmable processing device, such as a microprocessor, digital signal processor or other data processing device, apparatus or system), it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may, for example, be embodied as object code.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention. For example, the invention is not limited to the examples provided, above, relating to a customer browser and a customer support agent browser. References above to a customer browser apply equally to any first browser and references above to a customer support agent browser apply equally to any second browser where the first and the second browsers are each associated with a communications terminal device and the associated communications terminal devices are connected or connectable via a voice or video communications connection. A user of the terminal may be human or a form of software application.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of establishing a connection between a WebRTC-capable software application and a server in a communications network;
   in which the connection is associated with a CLI or a URI;
   in which the method is performed by a WebRTC gateway and comprises:
      associating credentials with the WebRTC-capable software application;
      receiving from the server over a non-WebRTC communications channel, a connection request comprising the CLI or a URI;
      identifying from the CLI or the URI comprised in the connection request, a signalling channel for WebRTC for signalling to the WebRTC-capable software application;
      using the signalling channel, setting up a WebRTC media channel extending to the WebRTC-capable software application as part of the connection between the server and the WebRTC-capable software application; in which the connection comprises the WebRTC media channel extending to the WebRTC-capable software application and a non-WebRTC channel extending to the server; in which the WebRTC media channel and the non-WebRTC channel are interconnected for communication at an intermediate point of the connection; and disassociating the credentials from the WebRTC-capable software application at a time at which it is determined that the credentials are no longer required;

in which the credentials are disassociated from the WebRTC-capable software application in response to the user navigating away from a web page.

2. The method of claim 1, in which the CLI or the URI identifies the WebRTC gateway as the destination of the non-WebRTC communications channel and the WebRTC gateway interprets the CLI or the URI as identifying the signalling channel for WebRTC for signalling to the WebRTC-capable software application.

3. The method of claim 1, in which the time at which it is determined that the credentials are no longer required is on termination of the connection between the server and the WebRTC-capable software application.

4. The method of claim 1, in which the connection is established to carry a video or voice call; in which the time at which it is determined that the credentials are no longer required is on termination of the call.

5. The method of claim 4, in which the call is initiated in response to an anonymous call-back request issued by the WebRTC-capable software application.

6. The method of claim 5, in which the anonymous call-back request comprises the CLI or the URI.

7. The method of claim 1, in which the WebRTC media channel and the non-WebRTC channel comprise voice or video channels.

8. The method of claim 1, comprising receiving from the WebRTC-capable software application an authentication request comprising the credentials; and authenticating the WebRTC-capable software application based on the credentials received from the WebRTC-capable software application.

9. The method of claim 1, comprising providing the credentials to the WebRTC-capable software application.

10. The method of claim 1, in which the non-WebRTC channel comprises at least one of a SIP, VoIP and PSTN voice channel.

11. The method of claim 1, in which the WebRTC media channel and the non-WebRTC channel are interconnected for communication at the WebRTC gateway.

12. A WebRTC gateway comprising at least one processor configured in use to establish a connection between a WebRTC-capable software application and a second server in a communications network;

in which the connection is associated with a CLI or a URI;

in which the at least one processor is configured in use to:

associate credentials with the WebRTC-capable software application;

receive from the second server over a non-WebRTC communications channel, a connection request comprising the CLI or the URI;

identify from the CLI or the URI comprised in the connection request, a signalling channel for WebRTC for signalling to the WebRTC-capable software application;

use the signalling channel for WebRTC, to set up a WebRTC media channel extending to the WebRTC-capable software application as part of the connection between the second server and the WebRTC-capable software application; in which the connection comprises the WebRTC media channel extending to the WebRTC-capable software application and a non-WebRTC channel extending to the second server; in which the WebRTC media channel and the non-WebRTC channel are interconnected for communication at an intermediate point of the connection; and disassociate the credentials from the WebRTC-capable software application at a time at which it is determined that the credentials are no longer required in which the credentials are disassociated from the WebRTC-capable software application in response to the user navigating away from the web page.

13. The WebRTC gateway of claim 12, in which the CLI or the URI identifies the WebRTC gateway as the destination of the non-WebRTC communications channel and the WebRTC gateway interprets the CLI or the Uris identifying the signalling channel for WebRTC.

14. The WebRTC gateway of claim 12, in which the WebRTC media channel and the non-WebRTC channel comprise voice or video channels.

15. The WebRTC gateway of claim 12, in which the non-WebRTC channel comprises at least one of a SIP, VoIP and PSTN channel.

16. The WebRTC gateway of claim 12, in which the WebRTC media channel and the non-WebRTC channel are interconnected for communication at the WebRTC gateway.

* * * * *